(12) United States Patent
Lu et al.

(10) Patent No.: US 8,777,100 B2
(45) Date of Patent: Jul. 15, 2014

(54) METHOD FOR INPUTTING A PASSWORD AND A DEVICE THEREFOR

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 600 days.

(21) Appl. No.: 12/812,042

(22) PCT Filed: Mar. 12, 2010

(86) PCT No.: PCT/CN2010/071001
§ 371 (c)(1),
(2), (4) Date: Jul. 8, 2010

(87) PCT Pub. No.: WO2010/102577
PCT Pub. Date: Sep. 16, 2010

(65) Prior Publication Data
US 2011/0042455 A1    Feb. 24, 2011

(30) Foreign Application Priority Data

Mar. 13, 2009  (CN) .......................... 2009 1 0079882
Mar. 13, 2009  (CN) .......................... 2009 1 0079883

(51) Int. Cl.
| G06Q 40/00 | (2012.01) |
| G07F 7/08 | (2006.01) |
| G07F 7/10 | (2006.01) |
| H04L 29/06 | (2006.01) |
| G06F 21/34 | (2013.01) |

(52) U.S. Cl.
CPC *G07F 7/10* (2013.01); *G07F 7/082* (2013.01); *H04L 63/0853* (2013.01); *G06F 21/34* (2013.01); *G07F 7/1066* (2013.01)

USPC ........... 235/379; 235/375; 235/380; 235/449; 705/64

(58) Field of Classification Search
USPC ......... 235/375, 376, 379, 380, 382, 385, 435, 235/441, 449, 451; 705/55, 56, 64, 67, 72, 705/17, 18
See application file for complete search history.

(56) References Cited

U.S. PATENT DOCUMENTS

| 2002/0111919 A1 * | 8/2002 | Weller et al. ..................... 705/67 |
| 2003/0229597 A1 * | 12/2003 | de Jong ........................... 705/72 |
| 2004/0073802 A1 | 4/2004 | Seol |
| 2007/0028118 A1 * | 2/2007 | Brown et al. ................. 713/185 |

* cited by examiner

*Primary Examiner* — Michael G Lee
*Assistant Examiner* — Tabitha Chedekel
(74) *Attorney, Agent, or Firm* — Hammer & Associates, P.C.

(57) ABSTRACT

A method for inputting a password and a device thereof are disclosed in the invention, relating to the information security field and solving the problem that a password input by a user is easy to be intercepted. The method includes steps that, a password inputting device acquires an instruction in accordance with ISO/IEC 7816 standard from an upper computer, and determines whether the instruction is a password checking instruction or not, and if it is not, the device sends the instruction to the smart card; or else if it is, the device receives the password input by the user, encloses it to the password checking instruction, sends the instruction enclosed with the password to the smart card, receives the result of executing the password checking instruction from the smart card, and sends the result to the upper computer. The solution of the invention is used for improving the security of inputting a password in avoidance that the password is intercepted when being transmitted.

13 Claims, 8 Drawing Sheets

METHOD FOR INPUTTING A PASSWORD AND A DEVICE THEREFOR

FIELD OF THE INVENTION

The present invention relates to the information security field, in particular to a method for inputting a password and a device therefor.

PRIOR ART

At present, after a password is input by a user, it is commonly received by a terminal device (e.g. a computer) connected to the networking, and sent to the service center of a bank by the networking and authenticated by a bank service center. During the process of transmitting the password input by the user by the networking, the password input by a user is easy to be intercepted by an illegal user, and therefore the security of the password input by a user is paid more attention.

In order to eliminate the problem of the lower security of inputting and transmitting the password input by a user, many solutions are provided, such as digital certificates, however they failed to solve the problem completely. The password input by a user is still received by a terminal device (e.g. a computer) connected to the networking, and when the terminal device is illegally controlled or monitored, in the process of the inputting, the illegal user can intercept the password input by a user on a terminal device connected to the networking, which damages security of the password input by a user.

SUMMARY OF THE INVENTION

A method for inputting a password and a device therefor are provided in the invention, making the password uneasy to be intercepted in process of transmission, so that it improves the security of inputting a password.

In order to realize the above-mentioned object, solutions are applied in the invention.

A method for inputting a password comprises:
receiving an instruction in accordance with ISO/IEC 7816 standard from an upper computer;
determining whether the instruction is a password checking instruction;
if it is not, sending the instruction to the smart card; and
if it is, receiving the password input by the user, and enclosing the password input by the user to the password checking instruction, sending the instruction to the smart card, receiving the result of executing the password checking instruction from the smart card, and sending the result to the upper computer.

A password inputting device comprises
an instruction acquiring module for acquiring an instruction in accordance with ISO/IEC 7816 standard from an upper computer,
an instruction determining module for determining whether the instruction is a password checking module,
an inputting module for receiving the password input by a user after the instruction determining module determines that the instruction is a password checking instruction,
an instruction modifying module for enclosing the password input by the user to the password checking instruction,
a second communication module for sending the password checking instruction enclosed with the password input by the user to the smart card, and further for sending the instruction to the smart card after the instruction determining module determines that the instruction is not a password checking instruction, and for receiving the result of executing the password checking instruction from the smart card;
in which the instruction acquiring module is further used for sending the result of executing the password checking instruction to the upper computer.

With the solutions, the password input by a user is received on condition of electronic payment and sent to the smart card by the password inputting device, and authenticated by the smart card. In the process of inputting and transmitting a password, the password input by the user is not through a customer terminal (e.g. computer) connected to the internet, lowering the possibility of the password being intercepted, and therefore it improves the security of inputting a password.

BRIEF DESCRIPTION OF THE DRAWINGS

For clear description of the embodiments of the invention or the solution in prior art, a brief description will be given to the drawings of the embodiments or in prior art. Obviously, the drawings are only for part embodiments of the invention, according to which those skilled in the art can get other drawings without an inventive work.

DETAILED DESCRIPTION OF THE EMBODIMENTS

A clear and complete description of the solutions in the embodiments of the invention will be given below with the drawings of the embodiments. Obviously, the embodiments described here are only parts of embodiments of the invention, and any others, accomplished by those skilled in the art without any inventive work, based on the above-mentioned embodiments, will be still in the scope of protection of the invention.

Embodiment 1

Figure 1:
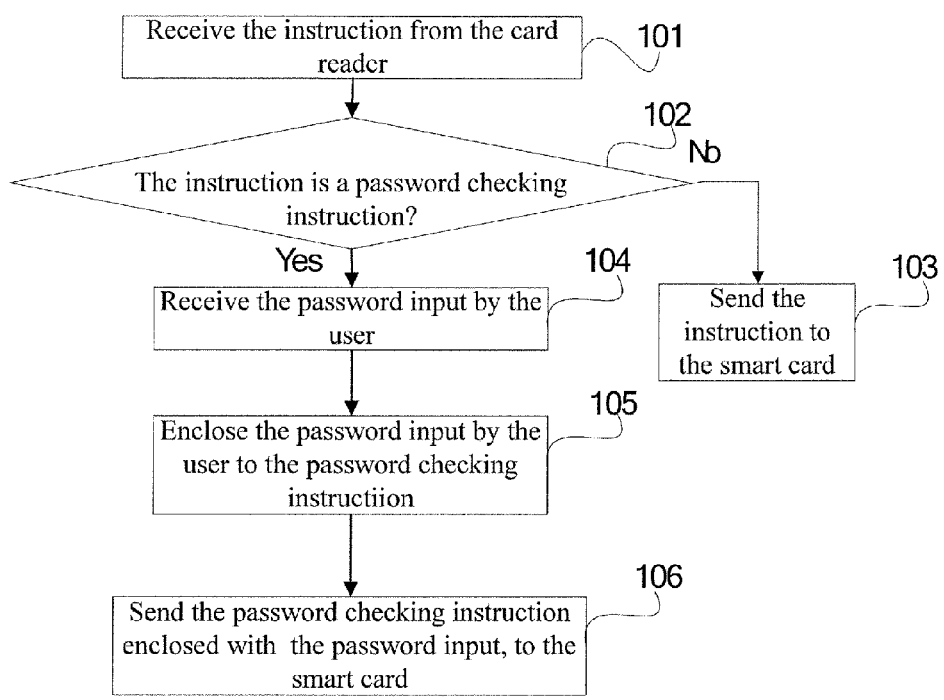
FIG. 1 is a flow chart of the method for inputting a password in an embodiment 1 of the invention.

A method for inputting a password is given in the embodiment 1 of the invention, as shown in FIG. 1, said method includes:

Step 101: a password inputting device receives an instruction from a card reader. The instruction received confirms to the 7816 regulation in format, a world-wide acknowledged smart card regulation. The instruction includes fields of CLA, INS, P1, P2, LC, and DATA.

The CLA field (abbreviation of Class) refers to the type of the instruction, one byte in length. The INS field (abbreviation of Instruction), one byte in length, refers to a designated instruction (an instruction name). The P1 and P2 fields (abbreviations of Parameter 1 and Parameter 2), one byte in length each, are used for checking an INS field or for inputting data. The LC field (abbreviation of length of command parameters), refers to the number of bytes in the instruction field. The DATA field refers to the instruction data, having a length of the value of the LC field. In sum, the CLA, INS, P1 and P2 field are named as the instruction head in all, the LC field refers to the instruction parameter, and the DATA field refers to the instruction.

Step 102: after receiving the instruction from the card reader, the password inputting device checks the instruction, and determines whether it is a password checking instruction according to the instruction type in the head of the instruction, if it is not, go to Step 103; or else go to Step 104.

Step 103: the password inputting device sends the instruction to a smart card so that the smart card operates according to the instruction, and ends all operations.

Step 104: the password inputting device receives a password input by a user with two methods, that is, if it receives the data input by the user with a keyboard of it within a predetermined duration, it uses the data as the password input by the user; or else, if it does not, it generates a random string and uses it as the password input by the user.

Step 105: after receiving the password input by the user, the password inputting device encloses the password to the password checking instruction.

Step 106: the password inputting device sends the password checking instruction enclosed with the password input by the user to the smart card, so that the smart card authenticates the password input.

Figure 2:
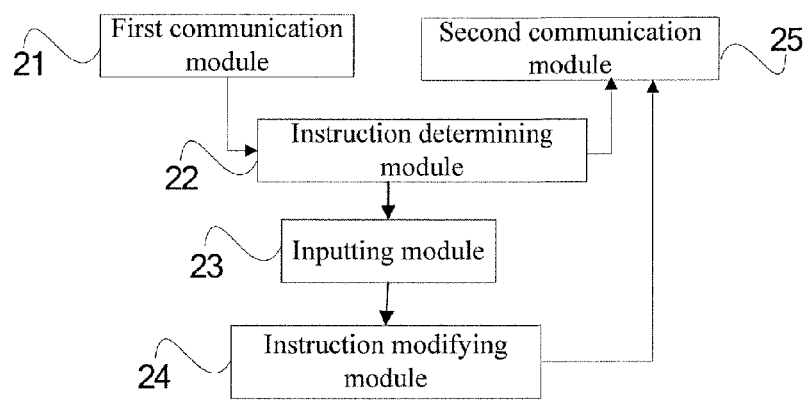
FIG. 2 is a structure chart of the method for inputting a password in the embodiment 1 of the invention.

A password inputting device is provided in the embodiment of the invention, as shown in FIG. 2, said device includes:

a card reader communication module 21, an instruction determining module 22, an inputting module 23, an instruction modifying module 24, and a second communication module 25.

The password inputting device receives an instruction from the card reader with the card reader communication module 21, which includes a head, instruction parameters, and data. The head carries information such as instruction type and instruction name, etc., and the instruction parameters give the number of bytes of the instruction. After the receiving, the password inputting device determines whether the instruction is a password checking instruction according to the instruction type in the head of the instruction, with the instruction determining module 22, if it is not, the device sends the instruction to the smart card with the second communication module 25; or else, the device receives the password input by a user with the inputting module 23 and encloses the password to the password checking instruction with the instruction modifying module 24, and sends the password checking instruction enclosed with the password input to the smart card with the second communication module 25.

There are two methods for the inputting module 24 to receive the password input by the user, that is, if the device receives the data input by the user with a keyboard of it within a predetermined duration, it uses the data as the password input by the user; or else, if the device does not, it generates a random string and uses it as the password input by the user.

In the embodiment of the invention, the password input by the user is received by the password inputting device, rather than by a customer terminal connected to internet, so that it eliminates the possibility that the password is intercepted by the customer terminal monitored by an invalid user, and therefore improves the security of inputting a password by the user. Moreover, the password input by the user is sent to the smart card by the password inputting device after an enclosure, rather than by a customer terminal connected to an internet, so that it eliminates the possibility that the password input by the user may be intercepted by an invalid user during transmission, and therefore improves the security of the password input by the user.

Embodiment 2

Figure 3:
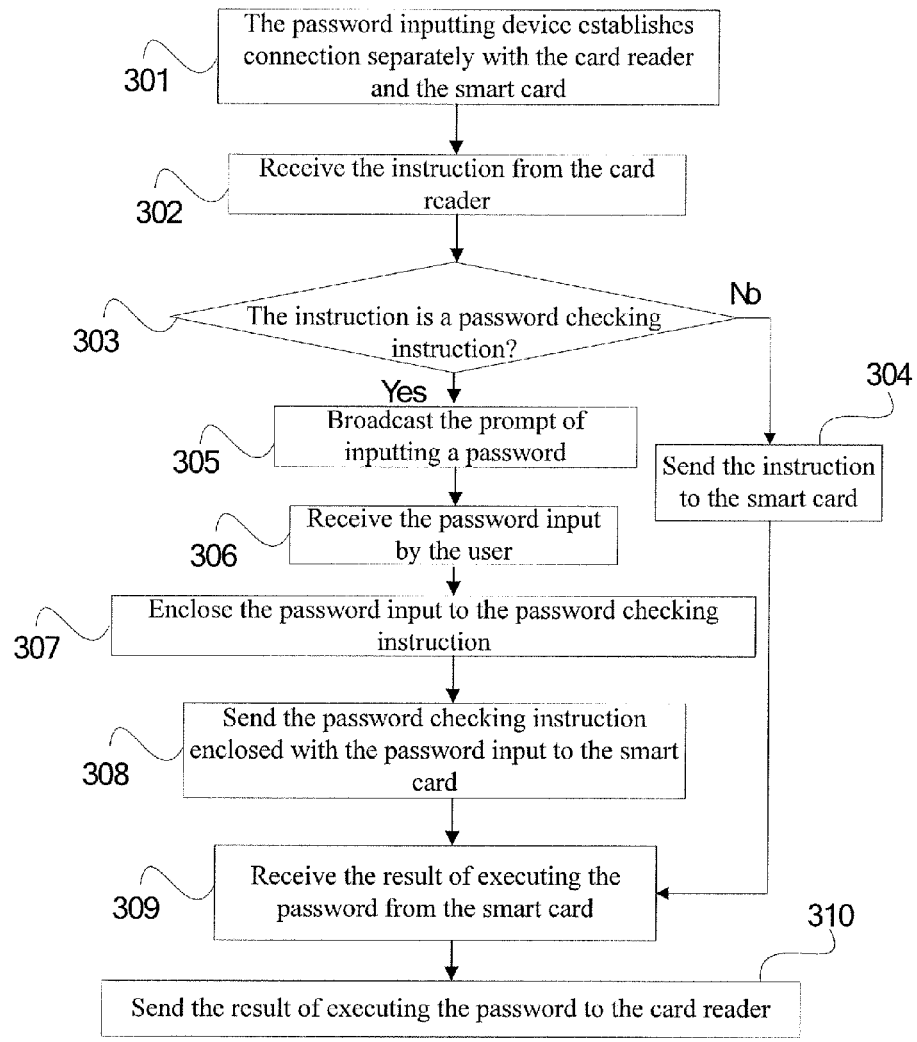
FIG. 3 is a flow chart of the method for inputting a password in an embodiment 2 of the invention.

A method for inputting a password in the embodiment of the invention is further provided, as shown in FIG. 3, said method includes the following steps.

Step 301: the password inputting device establishes a data communication connection separately with a card reader and a smart card before it receives an instruction from the card reader. The step of the connection further includes that, the password inputting device receives a reset signal from the card reader and sends it to the smart card, then receives the answer-to-reset information from the smart card and sends it to the card reader, and then receives the protocol & parameter selection instruction from the card reader and sends it to the smart card, as a result, the device establishes a connection separately with the card and the card reader.

Step 302: after connecting separately with the smart card and the card reader, the password inputting device receives an instruction from the card reader in format confirming to the 7816 regulation, a world-wide acknowledged smart card regulation. The instruction includes fields of CLA, INS, P1, P2, LC, and DATA.

The CLA field (abbreviation of Class) refers to the type of the instruction, one byte in length. The INS field (abbreviation of Instruction), one byte in length, refers to a designated instruction (an instruction name). The P1 and P2 fields (abbreviation of Parameter 1 and Parameter 2), one byte in length each, are used for checking the INS field or for inputting data. The LC field (abbreviation of length of command parameters), refers to the number of bytes of the instruction field. The DATA field refers to the instruction data, having a length of the value of the LC field. In sum, the CLA, INS, P1 and P2 fields are named as the instruction head in all, the LC field refers to the instruction parameter, and the DATA field refers to the instruction.

Step 303: after receiving the instruction from the card reader, the password inputting device determines whether the instruction is a password checking instruction according to the instruction type in the head of the instruction, if it is, Step 304 is executed; otherwise, Step 305 is executed.

Step 304: the password inputting device sends the instruction to the smart card, so that the smart card operates according to the instruction, then Step 309 is executed.

Step 305: the password inputting device broadcasts a prompt of inputting the password to the user by voice or display or a combination of voice and display.

Step 306: after the user receives the prompt, if the password is input by the user with a keyboard of the password inputting device within a predetermined duration, the device receives the password input with the keyboard by the user and uses it as a password input by the user; otherwise, the device automatically generates a random string and uses it as password input by the user.

Step 307: the password inputting device encloses the password input by the user to the password checking instruction, and prompts status information, such as "processing", and "wait please", etc.

For describing the process of enclosing the password input by the user to the password checking instruction, an example of the instruction being sent by the card reader is taken by 00200000021234, wherein the head of it is 00200000. Analyzing the head, the value of the CLA field is 00, the INS field is 20, the P1 field is 00, and the P2 field is 00, which in all describes the instruction as a password checking instruction. And in the instruction, the value of the LC field is 02, describing the data of the instruction an instruction 2 bytes in length; and the value of the DATA field is 1234. The below is the process of the enclosure, including: the password inputting device deletes fields of LC and DATA, and adds the password input by the user to the blank of the DATA field of the password checking instruction. Taking the password input by the user 112233 as an example, after the addition, the password inputting device adds the parameter, corresponding to the password input by the user, to the blank of the LC field of the password checking instruction for parameter renewal of the password checking instruction, and then encloses the password input by the user to the password checking instruction and gets the result 0020000003112233.

Further, before the password inputting device encloses the password input by the user to the password checking instruction, the password can be computed with algorithm, and then the password computed is enclosed to the password checking instruction. The password can be computed with any encryption algorithm or Hash algorithm in prior art. Taken 4321 as an example of the password received by the password inputting device, the password can be computed with SHA1 (Secure Hash Algorithm 1), and a result of abcd5678 is gotten. Analyzing the result, the LC field is 04 and the DATA field is abcd5678, and therefore the password checking instruction gotten from the result is 0020000004abcd5678.

Step 308: after the enclosure, the password inputting device sends the password checking instruction enclosed with the password input by the user to the smart card, so that the smart card authenticates the password input by the user.

Step 309: the password inputting device receives the result, gotten from executing the instruction, from the smart card. If the password received by the smart card is the password checking instruction, the result is a result of authenticating the password input by the user, including the information whether the password input by the user is correct or not; if the password received by the smart card is not the password checking instruction, the result is a result of executing the instruction.

Step 310: the password inputting device sends the result of executing the instruction, received from the smart card, to the card reader, so that the card reader operates according to the result of executing the instruction.

Figure 4:
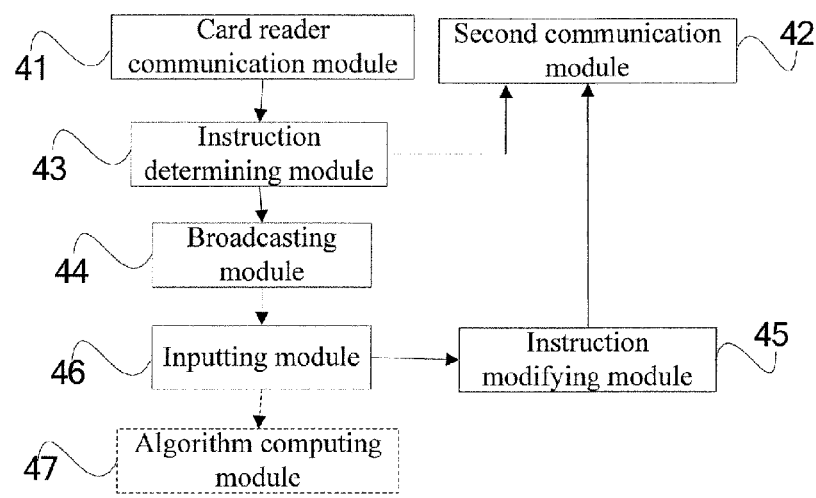
FIG. 4 is a structural frame of the method for inputting a password in the embodiment 2 of the invention.
Figure 5:
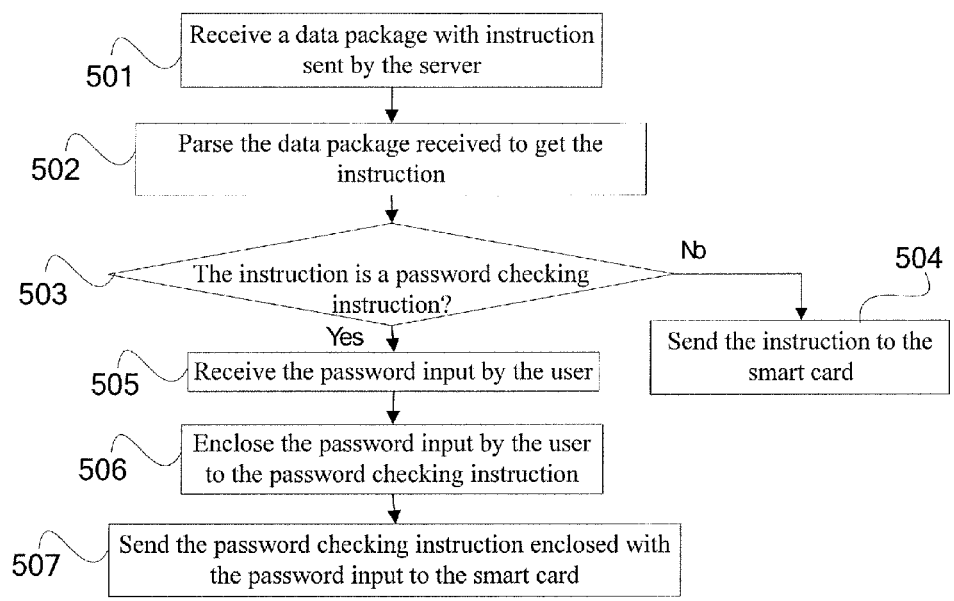
FIG. 5 is a flow chart of the method for inputting a password in an embodiment 3 of the invention.
Figure 6:
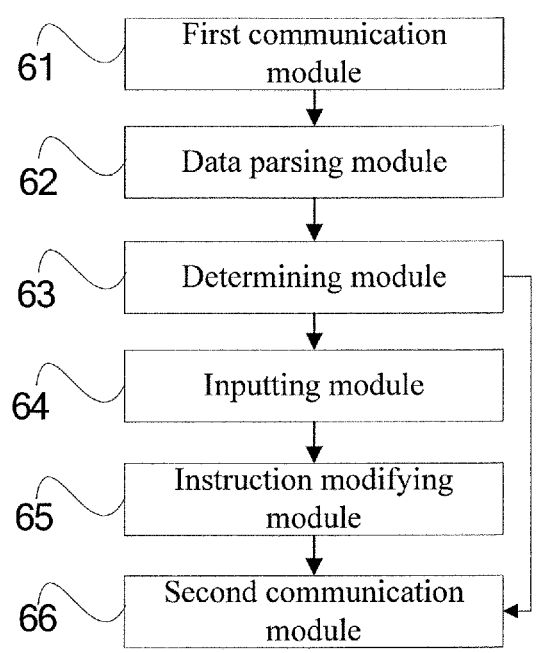
FIG. 6 is a structural frame of the password inputting device in the embodiment 3 of the invention.

A password inputting device is further provided in the embodiment of the invention, as shown in FIG. 4, said device includes a card reader communication module 41, a second communication module 42, an instruction determining module 43, a broadcasting module 44, an inputting module 45, an instruction modifying module 46, and an algorithm computing module 47.

Before the password inputting device receives the instruction from the card reader, the card reader and the smart card are required to establish a communication connection separately with the password inputting device. The card reader communication module 41 is used for establishing a communication connection between the card reader and the password inputting device. The second communication module 42 is used for establishing a communication connection between the smart card and the password inputting device. The card reader communication module 41 is further used for receiving an instruction from the card reader including a head, a LC field, and a DATA field, after the communication connection is established between the card reader and the password inputting device, and between the smart card and the device.

The instruction determining module 43 is used for determining whether the instruction is a password checking instruction or not, according to the instruction type in the head of the instruction after the password inputting device receives the instruction from the card reader. The broadcasting module 44 is used for broadcasting a prompt of the user inputting a password by voice or display or a combination of voice and display. After the broadcasting, the password inputting device receives the password input by the user with the inputting module 45, and encloses the password to the password checking instruction with the instruction modifying module 46 while broadcasting the password processing status information, with the broadcasting module 44, such as "processing", and "wait please", etc. After the enclosure, the password inputting device sends the password checking instruction enclosed with the password input to the smart card with the second communication module 42.

The smart card authenticates the received password input by the user, and returns the authentication result to the password inputting device. The device receives the result of executing the password checking instruction sent by the smart card, with the second communication module 42, and sends it to the card reader, with the card reader communication module 41, so that the card reader operates according to the result.

If the instruction is not a password checking instruction, the password inputting device sends the instruction to the smart card with the second communication module 42, so that the smart card operates according to the instruction. After the smart card executes the instruction, the password inputting device receives the result of executing the instruction with the second communication module 42, and sends the result, with the card reader communication module 41, to the card reader, so that the card reader operates according to the result.

There are two methods for the user inputting the password, that is, after the user receives the prompt of inputting a password from the password inputting device, if he/she inputs the password with a keyboard in the password inputting device within a predetermined duration, the device receives the data input through the keyboard with the inputting module 45 and uses it as the password input by the user; if he/she does not, the device generates a random string, and receives it with the inputting module, and uses it as the password input by the user.

The step of the card reader and the smart card separately establishing a data communication connection with the password inputting device includes that, firstly, the password inputting device receives a reset signal, with the card reader communication module, from the card reader and sends it, with the second communication module 42, to the smart card; and secondly, the device receives an ATR (answer to reset) signal, with the second communication module 42, from the smart card, and sends the signal, with the card reader communication module 41, to the card reader; and thirdly, the device receives the protocol & parameter selection instruction, with the card reader communication module 41, from the card reader, and sends it, with the second communication module 42, to the smart card. As a result, the card reader and the smart card establish a data communication connection separately with the password inputting device. The instruction modifying module 46 is used for enclosing the password input to the password checking instruction. The step of the enclosure includes that the password inputting device deletes the LC and DATA field of the password checking instruction, sent from the card reader, and adds the password input, to the DATA field, and modifies the LC field to the parameter corresponding to the password input by the user, with the instruction modifying module 46.

Before the device encloses the password input by the user to the password checking instruction with the instruction modifying module 46, the password input by the user can be computed with algorithm, such as encryption algorithm or HASH algorithm. Referring to FIG. 4, the algorithm computing module 47 in dotted line is used for computing the password input by the user, with algorithm, such as encryption algorithm or HASH algorithm. After the computing, the instruction modifying module 46 deletes the LC field and DATA field of the password checking instruction sent by card reader and adds the computed password, input by the user, to the DATA field of the instruction, and modifies the LC field to the parameter corresponding to the computed password input by the user.

In this embodiment of the invention, the password inputting device separately establishing a data communication connection with a card reader and a smart card, before receiving the instruction from the card reader, ensures the timely and exact transmission of the password input, between the card reader and the smart card. And the password input by the user is received by the password inputting device, rather than by a customer terminal connected to internet, so that it eliminates the possibility of an invalid user monitoring the customer terminal and intercepting the password input by a valid user, and therefore it improves the security of the user inputting a password. Moreover, the password input by the user is sent to the smart card by the password inputting device after the enclosure, rather than by a customer terminal connected to an internet, so that it eliminates the possibility of the password input by the user being intercepted by an invalid user during transmission, and therefore improves the security of the password input by the user. Moreover, the password input by the user, being sent to the smart card by the password inputting device, rather than by a customer terminal connected to the internet, eliminates the possibility of an invalid user intercepting the password input by a valid user through internet, and therefore it improves the security of a user inputting a password.

Embodiment 3

A method for inputting a password is provided in the embodiment 3 of the invention, as shown in FIG. 1, said method includes the following steps.

Step 501: a password inputting device receives a data package with instruction sent by a server.

Step 502: after the receiving, the password inputting device parses the data package and gets the instruction, which in format confirms to the 7816 regulation, a world-wide acknowledged regulation and includes fields of CLA, INS, P1, P2, LC, and DATA.

The CLA field (abbreviation of Class) refers to the type of the instruction, one byte in length. The INS field (abbreviation of Instruction), one byte in length, refers to a designated instruction (an instruction name). The P1 and P2 fields (abbreviations of Parameter 1 and Parameter 2), one byte in length each, are used for checking an INS field or for inputting data. The LC field (abbreviation of length of command parameters), refers to the number of bytes in the instruction field. The DATA field refers to the data field, with the value of the LC field in length. In sum, the CLA, INS, P1 and P2 field are named as the instruction head in all, the LC field refers to the instruction parameter, and the DATA field refers to the instruction.

The step of the data parsing includes sub-steps as followings.

If the password inputting device is connected to the server with a USB interface, it parses the data package, confirmed to the CCID protocol (Chip/Smart Card Interface Devices), received with the USB interface, and gets the instruction confirming to the 7816 regulation; if the device is connected to the server with a 1394 interface or other interface, it parses the data package and gets the instruction confirming to the 7816 regulation.

Step 503: after the password inputting device receives the instruction parsed, it determined whether the instruction is a password checking instruction according to the instruction type in the head of the instruction, if it is, go to Step 105; or else, go to Step 104.

Step 504: the password inputting device sends the instruction to the smart card, so that the smart card operates according to the instruction.

Step 505: the password inputting device receives the password input by the user with two methods, that is, if the device receives the data input by the user with a keyboard of it within a predetermined duration, it uses the data as the password input by the user; or else, if the device does not, it generates a random string and uses it as the password input by the user.

Step 506: after the password inputting device receives the password input by the user, it encloses the password to the password checking instruction.

Step 507: after the enclosure, the password inputting device sends the password checking instruction enclosed with the password to the smart card, so that the smart card authenticates the password input by the user.

A password inputting device is further provided in this embodiment, as shown in FIG. 2, said device includes a first communication module 61, a data parsing module 62, a determining module 63, an inputting module 64, an instruction modifying module 65, and a second communication module 66.

The password inputting device receives the data package with the instruction from the server with the first communication module 61, and parses the instruction from the data package with the data parsing module 62. The parsed instruction includes a head, parameters and data, wherein the head includes information such as type and name of the instruction, etc., and the parameters refer to the number of bytes of the instruction. In the step of the parsing, if the password inputting device is connected to the server with a USB interface, it parses the data package, confirmed to the CCID protocol (Chip/Smart Card Interface Devices), received with the USB interface, and gets the instruction confirming to the 7816 regulation; and if the device is connected to the server with a 1394 interface or other interface, it parses the data package and gets the instruction confirming to the 7816 regulation.

After the parsing, the password inputting device determines whether the instruction is a password checking instruction or not, according to the instruction type in the head of the instruction, if it is not, the device sends the instruction to the smart card with the second communication module 66, so that the smart card operates according to the instruction; if it is, the device receives the password input by the user with the inputting module 64, and encloses the password, received by the inputting module 64, to the password checking instruction with the instruction modifying module 65, and sends the password checking instruction to the smart card, so that the smart card authenticates the password input by the user.

In the embodiment of the invention, the password input by the user is received by the password inputting device, rather than by a customer terminal (e.g. computer) connected to internet, so that it eliminates the possibility that the password is intercepted by the customer terminal monitored by an invalid user, and therefore improves the security of inputting a password by the user. Moreover, the password input by the user is sent to the smart card by the password inputting device after an enclosure, rather than by a customer terminal connected to an internet, so that it eliminates the possibility that the password input by the user may be intercepted by an invalid user during transmission, and therefore improves the security of the password input by the user.

Embodiment 4

Figure 7:
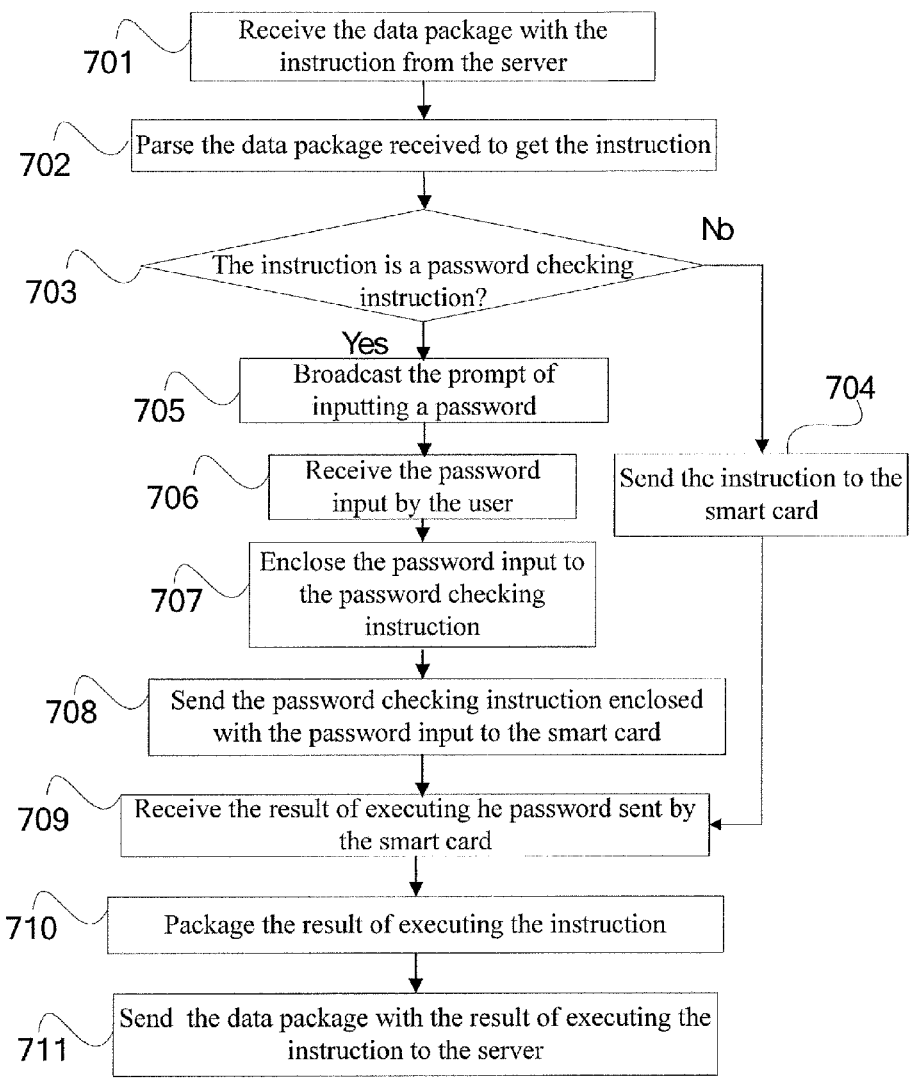
FIG. 7 is a flow chart of the method of inputting a password in an embodiment 4 of the invention.

A method for inputting a password is provided, as shown in FIG. 7, said method includes the following steps.

Step 701: the password inputting device receives a data package from the server, in which an instruction is included.

Step 702: after the receiving, the password inputting device parses the data package and gets the instruction, which confirms to the 7816 regulation, a world-wide acknowledged regulation, in format and includes fields of CLA, INS, P1, P2, LC, and DATA.

The CLA field (abbreviation of Class) refers to the type of the instruction, one byte in length. The INS field (abbreviation of Instruction), one byte in length, refers to a designated instruction (an instruction name). The P1 and P2 fields (abbreviations of Parameter 1 and Parameter 2), one byte in length each, are used for checking an INS field or for inputting data. The LC field (abbreviation of length of command parameters), refers to the number of bytes in the instruction field. The DATA field refers to the instruction data, having a length of the value of the LC field. In sum, the CLA, INS, P1 and P2 field are named as the instruction head in all, the LC field refers to the instruction parameter, and the DATA field refers to the instruction.

In the step of the parsing, if the password inputting device is connected to the server with a USB interface, it parses the data package, confirming to the CCID protocol (Chip/Smart Card Interface Devices), received with the USB interface, and gets the instruction confirming to the 7816 regulation; and if the device is connected to the server with a 1394 interface or other interface, it parses the data package and gets the instruction confirming to the 7816 regulation.

Step 703: after the password inputting device receives the instruction, it determines whether the instruction is a password checking instruction or not, according to the instruction type in the head of the instruction, if it is not, go to Step 704; or else, go to Step 705.

Step 704: the password inputting device sends the instruction to the smart card, so that the smart card operates according to the instruction. After Step 704, a Step 709 is followed.

Step 705: the password inputting device broadcasts the prompt of the user inputting a password by voice or display or a combination of voice and display.

Step 706: after the user receives the prompt of inputting a password broadcast by the device, if the password is input by the user with a keyboard of the password inputting device within a predetermined duration, the device receives the data input with the keyboard by the user and uses it as a password input by the user; otherwise, the device automatically generates a random string and uses it as password input by the user.

Step 707: the password inputting device encloses the password input by the user to the password checking instruction, and broadcasts status information, such as "processing", and "wait please", etc.

For describing the process of enclosing the password input by the user to the password checking instruction, an example of the instruction being sent by the server is taken by 00200000021234, wherein the head of it is 00200000. Analyzing the head, the value of the CLA field is 00, the INS field is 20, the P1 field is 00 and the P2 field is 00, which in all describes the instruction as a password checking instruction. And in the instruction, the value of the LC field is 02, describing the data of the instruction as an instruction 2 bytes in length; and the value of the DATA field is 1234. The below is the process of the enclosure, including:

the password inputting device deletes fields of LC and DATA, and adds the password input by the user to the blank of the DATA field of the password checking instruction. Taking the password input by the user 112233 as an example, after the addition, the password inputting device adds the parameter, corresponding to the password input by the user, to the blank of the LC field of the password checking instruction for a parameter renew of the password checking instruction, and then encloses the password input by the user to the password checking instruction and gets the result 0020000003112233.

Further, before the password inputting device encloses the password input by the user to the password checking instruction, the password can be computed with algorithm, and then the password computed is enclosed to the password checking instruction. The password can be computed with any encryption algorithm or Hash algorithm in prior art. Taken 4321 as an example of the password received by the password inputting device, the password can be computed with MD5 algorithm (Message-digest Algorithm 5), and a result of abcd5678 is gotten. Analyzing the result, the LC field is 04 and the DATA field is abcd5678, and therefore the password checking instruction gotten from the result is 0020000004abcd5678.

Step 708: after the enclosure, the password inputting device sends the password checking instruction, enclosed with the password input by the user, to the smart card, so that the smart card authenticates the password input by the user.

Step 709: the password inputting receives the result of executing the instruction from the smart card, if in the previous step, the instruction received by the smart card is a password checking instruction, the result is a result from authenticating the password input by the user, including the information whether the password input by the user is correct or not; and if it is not, the result is a result from executing the instruction.

Step 710: the password inputting device packages the result of executing the instruction which confirms to the 7816 regulation, according to the interface-related transmission protocol, and generates a data package transmitted through the USB interface, 1394 interface or others, so that the result of executing the instruction returned from the smart card is sent to the server.

Step 711, the password inputting device sends the data package, including the result of executing the instruction sent by the smart card, to the server, so that the server operates according to the result.

Figure 8:
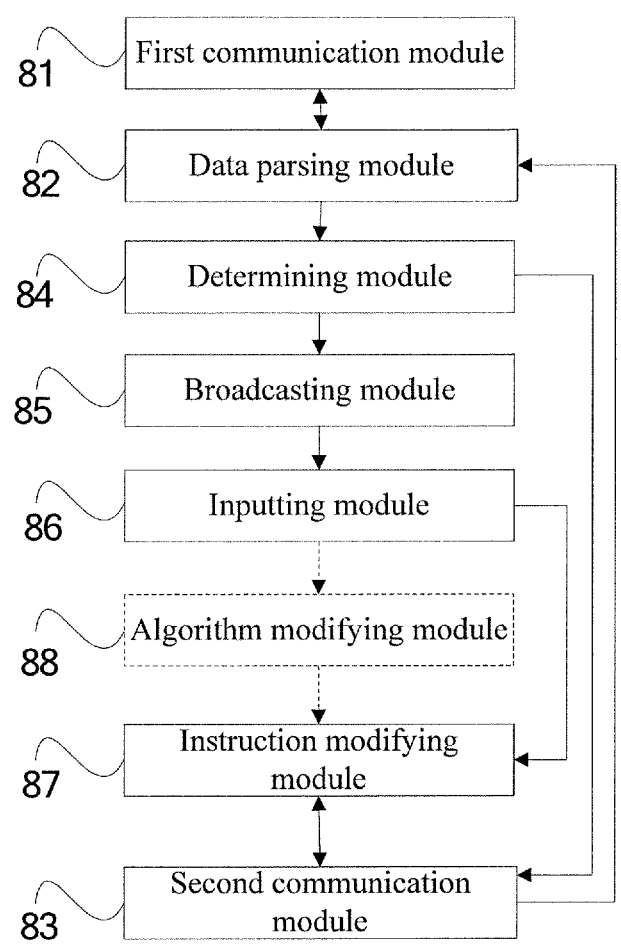
FIG. 8 is a structural frame of the password inputting device in the embodiment 4 of the invention.

A password input device is provided in the embodiment of the invention, as shown in FIG. 8, said device includes a first communication module 81, a data parsing module 82, a second communication module 83, a determining module 84, a broadcasting module 85, an inputting module 86, an instruction modifying module 87, and an algorithm computing module 88.

The password inputting device receives the data package from the server with the first communication module 81, and parses it, and gets the instruction with the data parsing module 82, in which a head, a LC and a DATA field are included. The step of the data parsing includes sub-steps as followings. If the password inputting device is connected to the server with a USB interface, it parses the data package, confirming to the CCID protocol (Chip/Smart Card Interface Devices), received with the USB interface, and gets the instruction confirming to the 7816 regulation; and if the device is connected to the server with a 1394 interface or others, it parses the data package and gets the instruction confirming to the 7816 regulation.

After the instruction is gotten by data parsing, the password inputting device determines whether the instruction is a password checking instruction or not, according to the instruction type in the head of the instruction, with the determining module 84; and if it is, a password is input, commonly beginning with a prompt of the user inputting the password. The prompt is broadcast by the password inputting device with the broadcasting module 85 by voice or display or a combination of voice and display. After the prompt broadcast is received by the user, the password is input with the keyboard of the password inputting device, such as a key-pressed keyboard or a touching keyboard, and is received by the inputting module 86. If the broadcast prompt of inputting the password is received by the user and the password is not input by the user with the keyboard within a predetermined duration, the password inputting device automatically generates a random string and the inputting module 86 is used for receiving the random string and using it as the password input by the user.

After the inputting module 86 receives the password input by the user, the password inputting device encloses the password, received by the inputting module 86, to the password checking instruction with the instruction modifying module 87. During the enclosure, the broadcasting module 85 is used for broadcasting the processing status of the password inputting device, such as "processing", "wait please" for prompt of the user waiting for minutes. After the enclosure, the password inputting device sends the password checking instruction enclosed with the password, to the smart card with the second communication module 83.

The smart card authenticates the password input by the user, and sends the authentication result to the password inputting device. The device receives the result of executing the password checking instruction from the smart card with the second communication module 83, and packages the result of executing the instruction, confirming to the 7816 regulation, according to the interface-related transmission protocol with the data parsing module 82, and generates a data package, able to being transmitted with a USE interface or a 1394 interface or others, and sends the result with the first communication module 81 to the server, so that it communicates with the server in accordance with the result.

If the instruction is not a password checking instruction, the password inputting device sends the instruction to the smart card with the second communication module 83, so that the smart card operates according to the instruction.

After the smart card processes the instruction received, it sends the result of executing the instruction to the password inputting device and the device receives the result with the second communication module 83. For sending the result to the server, the device packages the result, confirming to the 7816 regulation according to the interface-related transmission protocol with the data parsing module 82, and generates a data package able to be transmitted with a USB interface, or a 1394 interface or others, and sends the result with the first communication module 81 to the server, so that it communicates with the server in accordance with the result.

In the step of enclosing the password input to the password checking instruction by the password inputting device with the instruction modifying module, firstly, the instruction modifying module 87 deletes the LC and DATA fields of the instruction sent by the server, and adds the password input by the user to the DATA field of the instruction, and then modifies the LC field to the password-related parameter.

Before the instruction modifying module 87 encloses the password input by the user, to the password checking instruction, the password can be computed with the computing module 88 in dotted line in FIG. 4, by algorithm, such as encryption algorithm and HASH algorithm. The computing module 88 is further used for deleting the LC and DATA field of the password checking instruction sent by the card reader, and for adding the password input by the user to the DATA field of the instruction, and for renewal of the parameters of the instruction to the parameters relating to the password input by the user.

In the embodiments of the invention, the password input by the user is received by the password inputting device, rather than by a terminal (e.g. computer) connected to the internet, so that it eliminates the possibility of an invalid user monitoring the terminal and intercepting the password input by the valid user, and therefore it improves the security of a user inputting a password. Moreover, the password input by the user is enclosed and sent to the smart card by the password inputting device, rather than by a terminal connected to the internet, so that it eliminates the possibility of the password input by the user being intercepted by an invalid user in process of transmission, and therefore improves the security of the user inputting a password.

With description in the above-mentioned embodiments, those skilled in the art should get clear that the invention can be executed by software and necessary hardware, or only by hardware. And therefore, the solution of the invention in essence, or the part different from that solution in prior art, can be executed by software which can be stored in a readable storage medium, such as a software disk, a hard disk or a disc, etc., including some instructions run in a computer, such as a personal computer, a server, or a device connected to the Internet, to execute the methods in the embodiments of the invention.

The above-mentioned are only preferred embodiments of the invention, not a limit to the invention. Any change, substitution easy to be gotten by those skilled in the art will be protected by the invention, and therefore, the scope of protection of the invention is based on the claims.

The invention claimed is:

1. A method for inputting a password, wherein it comprises
receiving, by a password inputting device, an instruction in accordance with ISO/IEC 7816 standard sent by an upper computer wherein the instruction comprises class field, parameter field and data field; and
determining whether the instruction is a password checking instruction by a password inputting device;
if it is not, sending the instruction to a smart card by the password inputting device; and
if it is, receiving the password input by a user, enclosing the password input by the user to the password checking instruction by the password inputting device, sending the instruction to the smart card by the password inputting device, receiving the result of executing the password checking instruction from the smart card by the password inputting device, and sending the result to the upper computer by the password inputting device;
wherein the step of enclosing the password input by the user to the password checking instruction comprises following sub-steps of
deleting the parameters field and data field of the password checking instruction,
adding the password input by the user to the data field of the password checking instruction, and
renewing the parameters field of the password checking instruction as the parameters of the current instruction.

2. The method for inputting a password of claim 1, wherein it further comprises a step of broadcasting a prompt of inputting the password, on condition that the instruction is a password checking instruction.

3. The method for inputting a password of claim 1, wherein it further comprises a step of computing the password input by the user with algorithm before the step of enclosing the password input by the user to the password checking instruction.

4. The method for inputting a password of claim 1, wherein the upper computer refers to a card reader, and receiving an instruction in accordance with ISO/IEC 7816 standard from an upper computer refers to receiving the instruction from the card reader.

5. The method for inputting a password of claim 4, wherein, before the step of receiving the instruction from the card reader, it further comprises steps of receiving a reset signal from the card reader, sending the reset signal to the smart card, and receiving an Answer-To-Reset signal from the smart card, sending the Answer-To-Reset signal to the card reader, receiving a protocol & parameter selection instruction from the card reader, and sending the protocol & parameter selection instruction to the smart card.

6. The method for inputting a password of claim 1, wherein the upper computer refers to a server, and receiving an instruction from an upper computer refers to receiving a data package including the instruction from the server, and parsing the data package to get the instruction.

7. A password inputting device, wherein it comprises
an instruction acquiring module for acquiring an instruction in accordance with ISO/IEC 7816 standard from an upper computer wherein the instruction comprises class field, parameter field and data field,
an instruction determining module for determining whether the instruction is a password checking instruction according to the instruction type in the class field of the instruction,
an inputting module for receiving the password input by a user after the instruction determining module determines that the instruction is a password checking instruction,
an instruction modifying module for enclosing the password input by the user to the password checking instruction, and
a communication module for sending the password checking instruction enclosed with the password input by the user to the smart card, and further for sending the instruction to the smart card after the instruction determining module determines that the instruction is not a password checking instruction, and for receiving the result of executing the password checking instruction from the smart card,
in which the instruction acquiring module is further used for sending the result of executing the password checking instruction to the upper computer;
wherein the instruction modifying module is further used for deleting the parameters field and data field of the password checking instruction, for adding the password input by the user to the data field of the password checking instruction, and for renewing the parameters field of the password checking instruction as those of the current instruction.

8. The password inputting device of claim 7, wherein it further comprises a broadcasting module for broadcasting a prompt of inputting the password when the instruction is a password checking instruction.

9. The password inputting device of claim 7, wherein it further comprises a computing module for computing the password, input by the user, with algorithm before enclosing the password input by the user to the password checking instruction.

10. The password inputting device of claim 7, wherein the upper computer is a card reader.

11. The password inputting device of claim 7, wherein
the instruction acquiring module is further used for receiving a reset signal from the card reader,
the communication module is further used for sending the reset signal to the smart card and receiving an Answer-To-Reset signal from the smart card,
a card reader communication module is further used for sending the Answer-To-Reset signal to the card reader and receiving the protocol & parameter selection instruction from the card reader; and
the communication module is used for sending the protocol & parameter selection instruction to the smart card.

12. The password inputting device of claim 7, wherein the upper computer is a server.

13. The password inputting device of claim 12, wherein the instruction acquiring module includes a first communication unit and a data parsing unit, and the first communication unit is used for receiving the data package including the instruction from the server, and the data parsing module is used for parsing the received data package to get the instruction.

* * * * *